(12) United States Patent
Liu (10) Patent No.: US 10,936,633 B2
(45) Date of Patent: Mar. 2, 2021

(54) SEARCH RECOMMENDING METHOD AND APPARATUS, APPARATUS AND COMPUTER STORAGE MEDIUM

(71) Applicant: BAIDU ONLINE NETWORK TECHNOLOGY (BEIJING) CO., LTD., Beijing (CN)

(72) Inventor: Junqi Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 363 days.

(21) Appl. No.: 15/747,123

(22) PCT Filed: Nov. 27, 2015

(86) PCT No.: PCT/CN2015/095781
§ 371 (c)(1),
(2) Date: Jan. 23, 2018

(87) PCT Pub. No.: WO2017/012235
PCT Pub. Date: Jan. 26, 2017

(65) Prior Publication Data
US 2018/0373721 A1    Dec. 27, 2018

(30) Foreign Application Priority Data

Jul. 23, 2015 (CN) .......................... 201510438250.8

(51) Int. Cl.
*G06F 17/00* (2019.01)
*G06F 16/332* (2019.01)
(Continued)

(52) U.S. Cl.
CPC ...... *G06F 16/3322* (2019.01); *G06F 16/3334* (2019.01); *G06F 16/951* (2019.01); *G06F 16/955* (2019.01); *G06F 40/20* (2020.01)

(58) Field of Classification Search
None
See application file for complete search history.

(56) References Cited

U.S. PATENT DOCUMENTS 8,825,620 B1 *  9/2014  Fliedner ............ G06F 16/90335
                                                 707/706
8,977,982 B1    3/2015  Amacker
                        (Continued)

FOREIGN PATENT DOCUMENTS

CN     103164521 A     6/2013
CN     103577463 A     2/2014
                (Continued)

OTHER PUBLICATIONS

International Search Report for PCT/CN2015/095781 dated Apr. 19, 2016 and its English translation provided by WIPO.

(Continued)

*Primary Examiner* — Hasanul Mobin
(74) *Attorney, Agent, or Firm* — Ladas & Parry, LLP (57) ABSTRACT

Embodiments of the present disclosure provide a search recommending method and apparatus, an apparatus and computer storage medium. On the one hand, in the embodiments of the present disclosure, page content currently displayed by the client is obtained, then a first recommended search word is obtained according to the page content currently displayed by the client, and the first recommended search word is output to the client so that the client displays the first recommended search word. Therefore, according to technical solutions provided by embodiments of the present disclosure, the recommended search word can be obtained in conjunction with the page content currently browsed by the user, and accuracy and effectiveness of search recommendation are improved.

12 Claims, 2 Drawing Sheets

(51) Int. Cl.
  *G06F 40/20* (2020.01)
  *G06F 16/955* (2019.01)
  *G06F 16/33* (2019.01)
  *G06F 16/951* (2019.01)

(56) References Cited

U.S. PATENT DOCUMENTS

| | | | |
|---|---|---|---|
| 9,015,148 B2 | 4/2015 | White et al. | |
| 2003/0037050 A1* | 2/2003 | Monteverde | G06F 16/951 |
| 2006/0155915 A1* | 7/2006 | Pereira | H04L 45/00 |
| | | | 711/100 |
| 2010/0082673 A1 | 4/2010 | Nakano et al. | |
| 2010/0094845 A1* | 4/2010 | Moon | G06F 16/3334 |
| | | | 707/705 |
| 2010/0162164 A1* | 6/2010 | Kwon | H04N 21/4828 |
| | | | 715/803 |
| 2010/0312767 A1* | 12/2010 | Saito | G06Q 30/02 |
| | | | 707/739 |
| 2012/0123855 A1* | 5/2012 | Gu | G06Q 30/0247 |
| | | | 705/14.46 |
| 2012/0136887 A1* | 5/2012 | Cha | G06F 16/9535 |
| | | | 707/767 |
| 2013/0282709 A1 | 10/2013 | Zhu et al. | |
| 2016/0217142 A1* | 7/2016 | Ye | G06F 16/3338 |

FOREIGN PATENT DOCUMENTS

| | | |
|---|---|---|
| CN | 104408112 A | 3/2015 |
| CN | 104462425 A | 3/2015 |
| CN | 105095440 A | 11/2015 |

OTHER PUBLICATIONS

Written Opinion of the International Search Authority for PCT/CN2015/095781 dated Apr. 19, 2016 and its English translation provided by Google Translate.
First Office Action for Chinese Application No. 201510438250.8 dated Dec. 18, 2017, with machine English translation provided by SIPO.
First Search for Chinese Application No. 201510438250.8 dated Nov. 29, 2017.
Communication pursuant to Article 94(3) EPC from EP app. No. 15898791.7, dated Feb. 20, 2019.
Invitation to file search results or a statement of non-availability pursuant to Rule 70b(1) EPC, from EP app No. 15898791.7, dated Dec. 14, 2018.
Decision to Refuse a European Patent Application from EP app. No. 15898791.7, dated Dec. 17, 2019.
Summons to attend oral proceedings pursuant to Rule 115(1) EPC from EP app. No. 15898791.7, dated Jul. 22, 2019.
Written Opinion of the International Searching Authority from PCT/CN2015/095781, dated Apr. 19, 2016, with English translation from WIPO.
International Preliminary Report on Patentability from PCT/CN2015/095781, dated Jan. 23, 2018, with English translation from WIPO.

* cited by examiner

SEARCH RECOMMENDING METHOD AND APPARATUS, APPARATUS AND COMPUTER STORAGE MEDIUM

CROSS-REFERENCE TO RELATED APPLICATIONS

The present disclosure is the U.S. national phase of PCT Application PCT/CN2015/095781 filed on Nov. 27, 2015, which claims priority to the Chinese patent application No. 201510438250.8 entitled "Search Recommending Method and Apparatus" filed on Jul. 23, 2015, the disclosures of which are hereby incorporated by reference in their entireties.

FIELD OF THE DISCLOSURE

The present disclosure relates to the technical field of the Internet application, and particularly to a search recommending method and apparatus, an apparatus and computer storage medium.

BACKGROUND OF THE DISCLOSURE

At present, when a user uses a terminal to browse a webpage, he usually uses a search engine to search for unlearnt information in the content of the page to obtain the desired information. It can be seen that a scenario for the user to initiate a search mainly stem from the user's non-learning of the information.

In the prior art, when the user initiates a search, he needs to open a search page at the client or in the browser, and input a key word. At this time, to make the user's input quicker, recommended search words are provided to the user, and the user may select a desired key word from the recommended search words. However, at present it is usual to provide the user with the recommended search words based on big data analysis, or recommend hot words to the user. None of the two manners does not take into account the scenario when the user initiates the search, so that the recommended search words provided to the user cannot meet the user's input demands, and accuracy and effectiveness of search recommendation is reduced.

SUMMARY OF THE DISCLOSURE

In view of the above, embodiments of the present disclosure provide a search recommending method and apparatus, an apparatus and computer storage medium, which may implement obtainment of the recommended search words in conjunction with the page content currently browsed by the user, and can improve accuracy and effectiveness of the search recommendation.

According to an aspect of the present disclosure, there is provided a search recommending method, comprising:
 obtaining page content currently displayed by the client;
 obtaining a first recommended search word according to the page content currently displayed by the client;
 outputting the first recommended search word to the client so that the client displays the first recommended search word.

The above aspect and any possible implementation mode further provide an implementation mode: the obtaining a first recommended search word according to the page content currently displayed by the client comprises:

performing word segmentation for a text in the page content currently displayed by the client to obtain at least one segmented word;
 according to key words input by other users upon initiating a search for the page content currently displayed by the client, ranking said at least one segmented word to obtain a ranking result;
 obtaining the first recommended search word according to the ranking result.

The above aspect and any possible implementation mode further provide an implementation mode: the obtaining a first recommended search word according to the page content currently displayed by the client comprises:
 obtaining the input key word;
 performing word-segmentation for a text in the page content currently displayed by the client to obtain at least one segmented word;
 screening said at least one segmented word according to the key word;
 matching in a recommended word repository according to the key word to obtain at least one candidate recommended word;
 obtaining said first recommended search word according to the screened said at least one segmented word and said at least one candidate recommended word.

The above aspect and any possible implementation mode further provide an implementation mode: the method further comprises:
 obtaining the first recommended search word selected by the user from the first recommended search words displayed by the client, as the key word;
 performing a search according to the key word.

The above aspect and any possible implementation mode further provide an implementation mode: the method further comprises:
 obtaining the first recommended search word selected by the user from the first recommended search words displayed by the client, as the key word;
 obtaining and outputting a second recommended search word according to the key word;
 performing a search according to the second recommend search word selected by the user from the output second recommended search words.

The above aspect and any possible implementation mode further provide an implementation mode: the obtaining page content currently displayed by the client comprises:
 after the client completes the uploading of the page content, obtaining page content currently displayed by the client; or,
 when the page content currently displayed by the client undergoes page roll, obtaining page content currently displayed by the client; or,
 receiving the currently-displayed page content sent by the client; or,
 receiving a web address sent by the client and obtaining the page content currently displayed by the client according to the web address.

According to another aspect of embodiments of the present disclosure, there is provided a search recommending apparatus, comprising:
 an obtaining unit configured to obtain page content currently displayed by the client;
 a processing unit configured to obtain a first recommended search word according to the page content currently displayed by the client;

an outputting unit configured to output the first recommended search word to the client so that the client displays the first recommended search word.

The above aspect and any possible implementation mode further provide an implementation mode: the processing unit is specifically configured to:

perform word segmentation for a text in the page content currently displayed by the client to obtain said at least one segmented word;

according to key words input by other users upon initiating a search for the page content currently displayed by the client, rank said at least one segmented word to obtain a ranking result;

obtain the first recommended search word according to the ranking result.

The above aspect and any possible implementation mode further provide an implementation mode: the processing unit is specifically configured to:

obtain the input key word;

perform word-segmentation for the text in the page content currently displayed by the client to obtain at least one segmented word;

screen said at least one segmented word according to the key word;

match in a recommended word repository according to the key word to obtain at least one candidate recommended word;

obtain said first recommended search word according to the screened said at least one segmented word and said at least one candidate recommended word.

The above aspect and any possible implementation mode further provide an implementation mode: the apparatus further comprises: a searching unit;

the obtaining unit is further configured to obtain the first recommended search word selected by the user from the first recommended search words displayed by the client, as the key word;

the searching unit is configured to perform a search according to the key word.

The above aspect and any possible implementation mode further provide an implementation mode: the apparatus further comprises: a searching unit;

the obtaining unit is further configured to obtain the first recommended search word selected by the user from the first recommended search words displayed by the client, as the key word;

the processing unit is further configured to obtain a second recommended search word according to the key word;

the outputting unit is further configured to output the second recommended search word;

the searching unit is configured to perform a search according to the second recommend search word selected by the user from the output second recommended search words.

The above aspect and any possible implementation mode further provide an implementation mode: the obtaining unit is specifically configured to:

after the client completes the uploading of the page content, obtain page content currently displayed by the client; or, when the page content currently displayed by the client undergoes page roll, obtain page content currently displayed by the client; or, receive the currently-displayed page content sent by the client; or, receive a web address sent by the client and obtain the page content currently displayed by the client according to the web address.

The technical solutions of embodiments of the present invention have the following advantageous effects:

According to technical solutions provided by embodiments of the present disclosure, the recommended search word can be obtained in conjunction with the page content currently browsed by the user, so that the drawn search suggestion is highly relevant to the user's demands. As compared with the manner of obtaining the recommended search word according to big data analysis or hot vocabulary in the prior art, technical solutions provided by the embodiments of the present disclosure can improve accuracy and effectiveness of search recommendation.

DETAILED DESCRIPTION OF PREFERRED EMBODIMENTS

The present disclosure will be described in detail in conjunction with figures and specific embodiments to make objectives, technical solutions and advantages of the present disclosure more apparent.

It should be appreciated that embodiments described here are only partial embodiments of the present disclosure, not all embodiments. Based on embodiments in the present disclosure, all other embodiments obtained by those having ordinary skill in the art without making inventive efforts all fall within the protection scope of the present disclosure.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

It should be appreciated that although terms such as "first" and "second" might be used in the embodiments of the present disclosure to describe the recommended search words, these recommended search words should not be limited to these terms. These terms are only used to distinguish the recommended search words from one another. For example, without departing from the scope of embodiments of the present disclosure, the first recommended search word may be called the second recommended search word, and similarly the second recommended search word may also be called the first recommended search word.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event)

is detected" may be construed as "when . . . is determined" or "responsive to determining" or "when . . . (stated condition or event) is detected" or "responsive to detecting (stated condition or event)".

Embodiment 1

Figure 1:
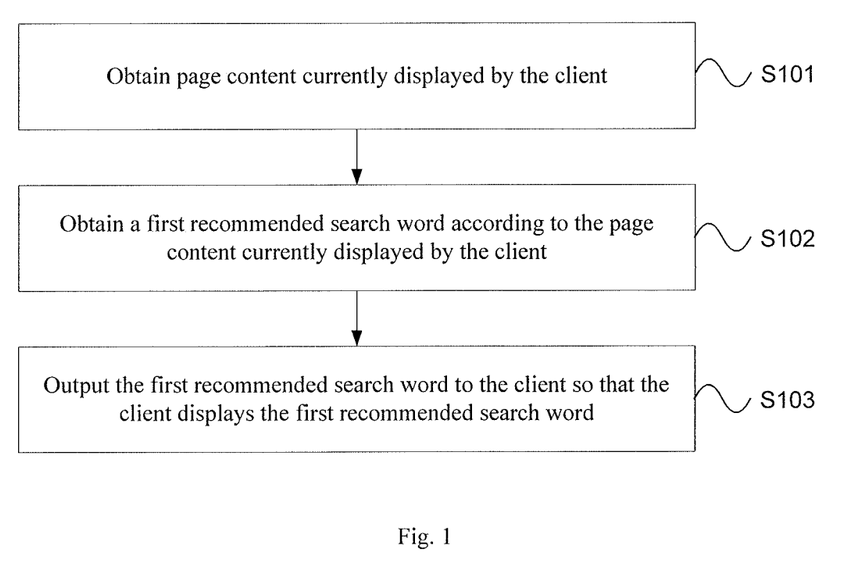
FIG. 1 is a flow chart of a search recommending method according to an embodiment of the present disclosure.

The present embodiment of the present disclosure provides a search recommending method. Referring to FIG. 1, FIG. 1 is a flow chart of a search recommending method according to an embodiment of the present disclosure. As shown in FIG. 1, the method comprises the following steps:

S101: obtaining page content currently displayed by the client.

S102: obtaining a first recommended search word according to the page content currently displayed by the client.

S103: outputting the first recommended search word to the client so that the client displays the first recommended search word.

Embodiment 2

Based on the search recommending method provided by Embodiment 1, the present embodiment specifically describes the method of obtaining page content currently displayed by the client. The step may specifically comprise:

For example, in the embodiment of the present disclosure, the step of obtaining page content currently displayed by the client may include but is not limited to:

The first type: after the client uploads the page content, the server obtains page content currently displayed by the client. It may be appreciated that completing the uploading of the patent content by the client may trigger the search recommending method according to the embodiment of the present disclosure.

The second type: when the page content currently displayed by the client undergoes page roll, the server obtains page content currently displayed by the client. It may be appreciated that the page roll undergone by the page content currently displayed by the client may trigger the search recommending method according to the embodiment of the present disclosure.

It may be appreciated that the page roll undergone by the page content currently displayed by the client may include up-down roll of the page content or left-right roll of the page content.

The third type: the server receives the currently-displayed page content sent by the client.

In a specific implementation procedure, after the client uploads the page content or after the page content currently displayed by the client undergoes page roll, the client may send the currently-displayed page content to the server. As such, the server may obtain the page content currently displayed by the client, wherein the page content described here may be a text in the page.

The fourth type: the server receives a web address sent by the client and obtains the page content currently displayed by the client according to the web address.

In a specific implementation procedure, after the client uploads the page content or after the page content currently displayed by the client undergoes page roll, the client may send the web address corresponding to the currently-displayed page content to the server. As such, the server, according to the web address sent by the client, obtains the page content from other servers providing the page content corresponding to the web address, wherein the page content is the patent content currently displayed by the client.

Embodiment 3

Based on the search searching method provided by Embodiment 1 and Embodiment 2, the present embodiment of the present disclosure specifically describes the method of obtaining the first recommended search word according to the page content currently displayed by the client as stated in S102. The step may specifically comprise:

For example, in the embodiment of the present disclosure, the method of obtaining the first recommended search word according to the page content currently displayed by the client may include but is not limited to the following two types:

The first type: first, the server may perform word-segmentation for the text in the page content currently displayed by the client to obtain at least one segmented word. Then, the server, according to key words input by other users upon initiating search for the page content currently displayed by the client, rank said at least one segmented word to obtain a ranking result. Finally, the server obtains the first recommended search word according to the ranking result.

In a specific implementation procedure, the server may use an already-existing segmented word dictionary to perform word segmentation for the page content currently displayed by the client to obtain said at least one segmented word.

In a specific implementation procedure, the server may pre-collect a correspondence relationship between the key words input by other users upon initiating search and the page content. As such, after the server obtains said at least one segmented word, he may obtain key words input by other users upon initiating search for the page content currently displayed by the client, and perform statistics of search hotness values of these key words and rank said at least one segmented word according to the search hotness values to obtain a ranking result. Segmented words with higher search hotness values rank higher, and segmented words with lower search hotness values rank lower. The search hotness values of the key words may be obtained according to total search times of the key words.

In a specific implementation procedure, the server may consider at least one segmented word ranking ahead as said first recommended search word according to the ranking result.

The second type: first, the server obtains the input key word. Then, the server may perform word-segmentation for the text in the page content currently displayed by the client to obtain at least one segmented word; screen said at least one segmented word according to the key word. Then, the server matches in a recommended word repository according to the key word to obtain at least one candidate recommended word. Finally, the server obtains said first recommended search word according to the screened said at least one segmented word and said at least one candidate recommended word.

In a specific implementation procedure, while sending the page content currently displayed by the client to the server, the client also send the key word input by the user in the search page to the server. As such, the server may obtain the user-input key word sent by the client.

In a specific implementation procedure, the server may use an already-existing segmented word dictionary to perform word segmentation for the text in the page content currently displayed by the client to obtain said at least one segmented word.

In a specific implementation procedure, the server may screen said at least one segmented word according to the key word to obtain a segmented word in said at least one segmented word related to the key word. For example, if the key word is "淘宝 (taobao)", and said at least one segmented word comprises "淘宝网 (taobao.com)", "端午节 (the Dragon Boat Festival)", "淘宝商城 (Taobao Mall)", "粽子 (Traditional Chinese rice-pudding)", "天猫 (Tmall)" and "淘宝装修 (Taobao decoration)", then the obtained segmented words related to the key word comprise "淘宝网 (Taobao.com)", "淘宝商城 (Taobao Mall)" and "淘宝装修 (Taobao decoration)".

In a specific implementation procedure, the server performs deduplication for the screened said at least one segmented word and said at least one candidate recommended word to remove repeated words therefrom; then, ranks the at least one segmented word and at least one candidate recommended word after the deduplication to obtain a ranking result, and considers the ranking result as the first recommended search word. Preferably, upon ranking, said at least one segmented word is ranked before said at least one candidate recommended word.

Embodiment 4

Based on the search recommending method according to Embodiment 1 as well as Embodiment 2 and Embodiment 3, Embodiment 4 of the present disclosure specifically describes the method of outputting the first recommended search word to the client so that the client displays the first recommended search word as stated in S103. The step may specifically comprise:

After the server obtains the first recommended search word, it is feasible to output the first recommended search word to the server so that the client may display the first recommended search word.

In a specific implementation procedure, the client may display the first recommended search word in the currently-displayed page content.

For example, the client may display the first recommended search word in the currently-displayed page content in a listing form, or for another example, the client may display the first recommended search word in the currently-displayed page content in a tiled manner.

Embodiment 5

Based on the search recommending method according to Embodiment 1 as well as Embodiment 2 to Embodiment 4, the embodiment of the present disclosure specifically describes optional steps of the provided search recommending method. The optional steps may specifically comprise:

In a specific implementation procedure, the server obtains the first recommended search word selected by the user from the first recommended search words displayed by the client, as the key word. Then, the server performs search according to the key word.

It may be appreciated that after the client displays the first recommended search word, the user may, from the displayed first recommended search words, select one first recommended search word to be searched, and then the server may consider the selected first recommended search word as the key word and initiates the searching procedure for the key word to obtain a matched search result.

In a specific implementation procedure, the server obtains the first recommended search word selected by the user from the first recommended search words displayed by the client, as the key word. Then, the server obtains and outputs a second recommended search word according to the key word, and performs search according to the second recommended search word selected by the user from the output second recommended search words.

It may be appreciated that after the client displays the first recommended search word, the user may, from the displayed first recommended search words, select one first recommended search word to be searched, and then the client may submit the first recommended search word as a key word to an input box of the search engine to trigger the server to obtain a search suggestion again, namely, the second recommended search word, according to the key word, and then output the second recommended search word to the client. As such, the client may display the second recommended search word to the user, and further perform search according to the second recommend search word selected by the user from the second recommended search words.

In the present embodiment, it is feasible to directly initiate a search according to the key word selected by the user from the first recommended search words, or further feasible to draw a search suggestion according to the key word selected by the user from the first recommended search words, and initiates a search according to the user's further selection in the search suggestion. The search accuracy in the latter manner is higher.

Embodiments of the present invention further provide an apparatus for implementing the steps and method in the above method embodiments.

Figure 2:
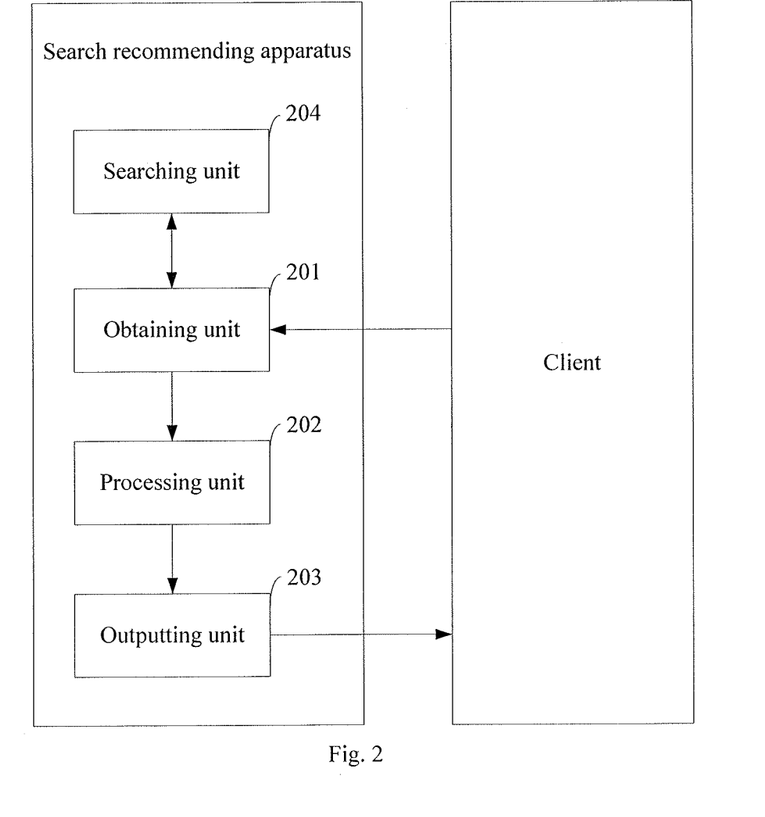
FIG. 2 is a block diagram of a search recommending apparatus according to an embodiment of the present disclosure.

Referring to FIG. 2, it is a block diagram of a search recommending apparatus according to an embodiment of the present disclosure. As shown in the figure, the apparatus comprises:

an obtaining unit 201 configured to obtain page content currently displayed by the client;

a processing unit 202 configured to obtain a first recommended search word according to the page content currently displayed by the client;

an outputting unit 203 configured to output the first recommended search word to the client so that the client displays the first recommended search word.

Preferably, the processing unit 202 is specifically configured to:

perform word segmentation for the page content currently displayed by the client to obtain said at least one segmented word;

according to key words input by other users upon initiating a search for the page content currently displayed by the client, rank said at least one segmented word to obtain a ranking result;

obtain the first recommended search word according to the ranking result.

Preferably, the processing unit 202 is specifically configured to:

obtain the input key word;

perform word-segmentation for the text in the page content currently displayed by the client to obtain at least one segmented word;

screen said at least one segmented word according to the key word;

match in a recommended word repository according to the key word to obtain at least one candidate recommended word;

obtain said first recommended search word according to the screened said at least one segmented word and said at least one candidate recommended word.

Preferably, the apparatus further comprises: a searching unit 204;

the obtaining unit 201 is further configured to obtain the first recommended search word selected by the user from the first recommended search words displayed by the client, as the key word;

the searching unit 204 is configured to perform a search according to the key word.

Or, optionally, the apparatus further comprises: a searching unit 204;

the obtaining unit 201 is further configured to obtain the first recommended search word selected by the user from the first recommended search words displayed by the client, as the key word;

the processing unit 202 is further configured to obtain a second recommended search word according to the key word;

the outputting unit 203 is further configured to output the second recommended search word;

the searching unit 204 is configured to perform a search according to the second recommend search word selected by the user from the output second recommended search words.

Preferably, the obtaining unit 201 is specifically configured to:

after the client completes the uploading of the page content, obtain page content currently displayed by the client; or, when the page content currently displayed by the client undergoes page roll, obtain page content currently displayed by the client; or, receive the currently-displayed page content sent by the client; or, receive a web address sent by the client and obtain the page content currently displayed by the client according to the web address.

Since units in the present embodiment can execute the method shown in FIG. 1, reference may be made to related depictions of FIG. 1 for portions not described in detail in the present embodiment.

The technical solutions of embodiments of the present invention have the following advantageous effects:

In the embodiments of the present disclosure, page content currently displayed by the client is obtained, then a first recommended search word is obtained according to the page content currently displayed by the client, and the first recommended search word is output to the client so that the client displays the first recommended search word.

According to technical solutions provided by embodiments of the present disclosure, the recommended search word can be obtained in conjunction with the page content currently browsed by the user, so that the drawn search suggestion is highly relevant to the user's demands. As compared with the manner of obtaining the recommended search word according to big data analysis or hot vocabulary in the prior art, technical solutions provided by the embodiments of the present disclosure can improve accuracy and effectiveness of search recommendation.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented through other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

What are stated above are only preferred embodiments of the present invention, not intended to limit the invention. Any modifications, equivalent replacements, improvements and the like made within the spirit and principles of the present invention, should all be included in the present invention within the scope of protection.

What is claimed is:

1. A search recommending method, wherein the method comprises:

obtaining, by a server, page content currently displayed by a client;

obtaining, by the server, an input key word;

performing, by the server, word-segmentation for a text in the page content currently displayed by the client to obtain at least one segmented word;

screening, by the server, said at least one segmented word according to the key word to obtain screened at least one segmented word related to the key word;

matching, by the server, in a recommended word repository according to the key word to obtain at least one candidate recommended word;

obtaining, by the server, said first recommended search word by ranking the screened at least one segmented word and said at least one candidate recommended word after removing repeated word from the screened at least one segmented word and said at least one candidate recommended word;

outputting, by the server, said first recommended search word to the client so that the client displays said first recommended search word.

2. The method according to claim 1, wherein the method further comprises:
obtaining the first recommended search word selected by the user from the first recommended search words displayed by the client, as the key word;
performing a search according to the key word.

3. The method according to claim 1, wherein the method further comprises:
obtaining the first recommended search word selected by the user from first recommended search words displayed by the client, as the key word;
obtaining and outputting a second recommended search word according to the key word;
performing a search according to the second recommend search word selected by the user from the output second recommended search words.

4. The method according to claim 1, wherein the obtaining page content currently displayed by the client comprises:
after the client completes the uploading of the page content, obtaining page content currently displayed by the client; or,
when the page content currently displayed by the client undergoes page roll, obtaining page content currently displayed by the client; or,
receiving the currently-displayed page content sent by the client; or,
receiving a web address sent by the client and obtaining the page content currently displayed by the client according to the web address.

5. An apparatus, comprising:
one or more processor;
a memory;
one or more programs stored in the memory and configured to execute the following operations when executed by the one or more processors:
obtaining page content currently displayed by a client;
obtaining an input key word;
performing word-segmentation for a text in the page content currently displayed by the client to obtain at least one segmented word;
screening said at least one segmented word according to the key word to obtain screened at least one segmented word related to the key word;
matching in a recommended word repository according to the key word to obtain at least one candidate recommended word;
obtaining said first recommended search word by ranking the screened at least one segmented word and said at least one candidate recommended word after removing repeated word from the screened at least one segmented word and said at least one candidate recommended word;
outputting said first recommended search word to the client so that the client displays said first recommended search word.

6. A non-transitory computer readable storage medium in which one or more programs are stored, an apparatus being enabled to execute the following operations when said one or more programs are executed by the apparatus:
obtaining page content currently displayed by a client;
obtaining an input key word;
performing word-segmentation for a text in the page content currently displayed by the client to obtain at least one segmented word;
screening said at least one segmented word according to the key word to obtain screened at least one segmented word related to the key word;
matching in a recommended word repository according to the key word to obtain at least one candidate recommended word;
obtaining said first recommended search word by ranking the screened at least one segmented word and said at least one candidate recommended word after removing repeated word from the screened at least one segmented word and said at least one candidate recommended word;
outputting the first recommended search word to the client so that the client displays the first recommended search word.

7. The apparatus according to claim 5, wherein the operation further comprises:
obtaining the first recommended search word selected by the user from the first recommended search words displayed by the client, as the key word;
performing a search according to the key word.

8. The apparatus according to claim 5, wherein the operation further comprises:
obtaining the first recommended search word selected by the user from first recommended search words displayed by the client, as the key word;
obtaining and outputting a second recommended search word according to the key word;
performing a search according to the second recommend search word selected by the user from the output second recommended search words.

9. The apparatus according to claim 5, wherein the operation of obtaining page content currently displayed by the client comprises:
after the client completes the uploading of the page content, obtaining page content currently displayed by the client; or,
when the page content currently displayed by the client undergoes page roll, obtaining page content currently displayed by the client; or,
receiving the currently-displayed page content sent by the client; or,
receiving a web address sent by the client and obtaining the page content currently displayed by the client according to the web address.

10. The non-transitory computer readable storage medium according to claim 6, wherein the operation further comprises:
obtaining the first recommended search word selected by the user from the first recommended search words displayed by the client, as the key word;
performing a search according to the key word.

11. The non-transitory computer readable storage medium according to claim 6, wherein the operation further comprises:
obtaining the first recommended search word selected by the user from first recommended search words displayed by the client, as the key word;
obtaining and outputting a second recommended search word according to the key word;
performing a search according to the second recommend search word selected by the user from the output second recommended search words.

12. The non-transitory computer readable storage medium according to claim 6, wherein the operation of obtaining page content currently displayed by the client comprises:

after the client completes the uploading of the page content, obtaining page content currently displayed by the client; or, when the page content currently displayed by the client undergoes page roll, obtaining page content currently displayed by the client; or, receiving the currently-displayed page content sent by the client; or, receiving a web address sent by the client and obtaining the page content currently displayed by the client according to the web address.

\* \* \* \* \*